United States Patent
Zabron et al.

[11] Patent Number: 5,906,269
[45] Date of Patent: May 25, 1999

[54] CONVEYOR BELTING AND METHOD OF MANUFACTURE

[75] Inventors: Florian S. Zabron, Orchard Park; David K. Rice, Alden, both of N.Y.; Ernest E. Atkins, Phoenix, Ariz.

[73] Assignee: Habasit Globe, Inc., Buffalo, N.Y.

[21] Appl. No.: 08/559,337

[22] Filed: Nov. 16, 1995

Related U.S. Application Data

[63] Continuation-in-part of application No. 08/289,767, Aug. 12, 1994, Pat. No. 5,495,935.

[51] Int. Cl.$^6$ .................................................. B65G 15/34
[52] U.S. Cl. ......................................... 198/847; 198/846
[58] Field of Search .................................... 198/846, 847

[56] References Cited

U.S. PATENT DOCUMENTS

| | | | |
|---|---|---|---|
| 2,575,813 | 11/1951 | Hutchins | 198/198 |
| 3,190,137 | 6/1965 | Adams, Jr. | 74/233 |
| 3,197,021 | 7/1965 | Williams | 198/193 |
| 3,870,141 | 3/1975 | Lapeyre et al. | |
| 3,966,659 | 6/1976 | Oxe' et al. | 252/8.62 |
| 3,983,761 | 10/1976 | Stewart | 74/231 |
| 4,094,402 | 6/1978 | Heeke | 198/847 |
| 4,154,335 | 5/1979 | Burnett et al. | 198/847 |
| 4,157,752 | 6/1979 | Sick et al. | 198/847 |
| 4,209,089 | 6/1980 | Day | 198/847 |
| 4,262,776 | 4/1981 | Wilson et al. | 184/15 |
| 4,369,081 | 1/1983 | Curry et al. | 156/148 |
| 4,407,333 | 10/1983 | Fowkes | 139/415 |
| 4,444,305 | 4/1984 | Parket et al. | 198/844 |
| 4,500,666 | 2/1985 | Wada | 524/232 |
| 4,526,637 | 7/1985 | Long | 156/137 |
| 4,643,920 | 2/1987 | McEntee et al. | 427/434.6 |
| 4,663,365 | 5/1987 | Reinehr et al. | 523/122 |
| 4,674,622 | 6/1987 | Utsunomiya et al. | 198/847 |
| 4,744,843 | 5/1988 | Lewis | 156/87 |
| 4,787,516 | 11/1988 | Morrison | 206/566 |
| 4,813,533 | 3/1989 | Long | 198/847 |
| 4,900,609 | 2/1990 | Arnold | 428/163 |
| 4,928,812 | 5/1990 | van Calker et al. | 198/847 |
| 4,935,232 | 6/1990 | McIntosh | 424/78 |
| 4,960,349 | 10/1990 | Willibey et al. | 405/262 |
| 4,996,052 | 2/1991 | McIntosh | 424/404 |
| 5,069,907 | 12/1991 | Mixon et al. | 424/445 |
| 5,073,235 | 12/1991 | Trokhan | 162/199 |
| 5,089,205 | 2/1992 | Huang et al. | 264/255 |
| 5,091,247 | 2/1992 | Willibey et al. | 428/255 |
| 5,161,677 | 11/1992 | Beecher | 198/847 |
| 5,182,035 | 1/1993 | Schmidt et al. | 508/572 |
| 5,238,749 | 8/1993 | Cueman et al. | 428/441 |
| 5,368,650 | 11/1994 | Tanaka et al. | 134/15 |
| 5,495,935 | 3/1996 | Zabron et al. | 198/847 |

FOREIGN PATENT DOCUMENTS

| | | | |
|---|---|---|---|
| 2412001 | 9/1975 | Germany | 198/847 |
| 3229813 | 2/1984 | Germany | 198/847 |
| 0072717 | 4/1985 | Japan | 198/847 |
| 5178434 | 7/1993 | Japan | 198/847 |
| 0542686 | 2/1977 | U.S.S.R. | 198/847 |

OTHER PUBLICATIONS

Microban–Custom Designed Applications For The Textile Industry (No Date).
Yokohama brochure No. CB–36 "It's New!" Clean Flex, Clean & Safety Belt, Yokohama 1993, 6 pages.

*Primary Examiner*—David A. Bucci
*Assistant Examiner*—Thuy V. Tran
*Attorney, Agent, or Firm*—Moore & Van Allen, PLLC

[57] ABSTRACT

A double-scrim belting (10) is described having a first woven scrim (12) and a spaced apart and substantially parallel second woven scrim (14) connected by staple fibers (16) consolidated together through entanglement and integrated with the scrims through entanglement, both entanglements being of the kind typically produced by needling. If desired, a non-woven web of staple fibers is needled to the outer surfaces of the scrims and the thusly formed belting is completely encapsulated in a matrix of elastomeric material (36). To further strengthen the connection between the scrims (12, 14), the scrims are additionally joined together by binder members (42) which extend in a direction of the thickness of the belting. If the belting is intended to be used to convey food grade products, preferably an antibacterial agent is incorporated into the elastomeric material to inhibit bacterial growth.

52 Claims, 4 Drawing Sheets

CONVEYOR BELTING AND METHOD OF MANUFACTURE

CROSS-REFERENCE TO RELATED APPLICATION

This application is a continuation-in-part of application Ser. No. 08/289,767, filed Aug. 12, 1994 now U.S. Pat. No. 5,495,935.

BACKGROUND OF THE INVENTION

1. Field of the Invention

The present invention relates to conveyor belting and to methods of manufacture of conveyor belting. More particularly, the belting of the present invention is a multiple-scrim belting comprising at least two spaced apart and generally parallel scrims having an intermediate fibrous material disposed therebetween.

One embodiment of the belting of the present invention comprises at least a first woven scrim and a spaced apart and substantially parallel second woven scrim, the scrims being joined together by staple fibers that are consolidated together through entanglement and integrated with the scrims through entanglement, both entanglements being of the kind typically produced by needling. If desired, a non-woven web of staple fibers is needled to the outer surfaces of the scrims and the thusly formed belting can be encapsulated in a matrix of elastomeric material. If the belting is intended to be used to convey food grade products, an antimicrobial agent can be incorporated into the elastomeric material to inhibit bacterial growth. The textile yarns comprising the scrims and the fibrous layers can also have incorporated therein an antimicrobial agent.

In another embodiment of the multiple-scrim belting of the present invention, the spaced apart scrims are joined together by entangled staple fibers with binder members reinforcing the connected scrims. The entangled staple fibers are also consolidated together through entanglement. Again, both entanglements are of the kind typically produced by needling. The resulting multiple-scrim belting having the entangled staple fibers joining the at least two scrims together with reinforcing binder members can be encapsulated in an elastomeric material, and if desired, the elastomer can have an antimicrobial agent incorporated therein. The textile yarns comprising the scrims and the fibrous layers can also have an antimicrobial agent incorporated therein.

2. Prior Art

U.S. Pat. Nos. 4,526,637 and 4,813,533 to Long describe a conveyor belting having a plurality of individual woven fabric layers having an intermediate non-woven mat or batt of entangled or spun-bonded staple fibers disposed therebetween. The non-woven fabric layer aids in absorption of a liquid polymeric resin saturant which encapsulates the fabric layers. However, the non-woven fabric layer is not needled to the woven fabric layers but instead is held together only with reinforcing cords which join the fabric layers.

U.S. Pat. No. 4,369,081 to Curry et al. describes a laminated foam-fabric belting having a layer of batting needled into the form and substrate fabric to form an integral laminated belting. However, this prior art belting is not encapsulated in an elastomeric saturant and neither is it a double-scrim belting.

U.S. Pat. Nos. 4,787,516 to Morrison, 5,069,907 to Mixon et al. and 5,238,749 to Cueman et al. describe the use of the antimicrobial agent 5-chloro-2-(2,4-dichlorophenoxy) phenol to inhibit bacterial growth in various devices. However, the use of this antimicrobial agent in a belting is not disclosed.

SUMMARY OF THE INVENTION

The present invention thus describes a conveyor belting, which comprises: (a) at least two generally planar and parallel scrim means, each comprising a plurality of substantially parallel textile yarns; (b) fibrous material provided intermediate the at least two scrim means, the fibrous material being in the form of discrete staple fibers consolidated together through entanglement of the individual fibers and the discrete staple fibers being integrated with the yarns comprising the scrim means by entanglement of the fibrous material therewith to connect between and thereby join the at least two scrim means, both entanglements being of the character produced by a needling operation; (c) a multiplicity of binding means extending substantially in a direction of a thickness of the at least two scrim means joined together by the entangled staple fibers to reinforce the connection between the scrim means; and (d) a polymeric material encapsulating the adjacent scrim means, the connecting fibrous material and the binding means.

In another embodiment, the present invention describes a conveyor belting, which comprises: (a) providing at least two generally planar and parallel scrim means, each comprising a plurality of substantially parallel textile yarns; (b) joining the scrim means in a needling step wherein an intermediate fibrous material in the form of discrete staple fibers is consolidated together through entanglement of the individual fibers by the needling and the discrete staple fibers are integrated with the yarns comprising the at least two scrim means to thereby connect between the scrim means by entanglement of the fibrous material therewith during the needling; (c) reinforcing the joined scrim means by providing a multiplicity of binder means extending substantially in a direction of a thickness of the at least two scrim means joined together by the entangled staple fibers; and (d) encapsulating the scrim means, the connecting fibrous material and the binder means by drawing them through a bath of polymeric material.

These and other aspects and benefits of the present invention will become increasingly more apparent by reference to the following description and to the following drawings.

DESCRIPTION OF THE PREFERRED EMBODIMENTS

Figure 1:
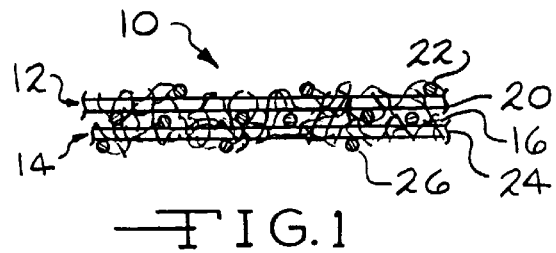
FIG. 1 is a cross-sectional view of one embodiment of the improved conveyor belting 10 according to the present invention.

Referring first to FIG. 1, there is shown an enlarged cross-sectional view of a double-scrim belting 10 of the present invention comprising a first woven or knitted scrim 12, a spaced apart and substantially parallel second woven or knitted scrim 14 joined together by a plurality of connecting staple fibers 16 consolidated together through entanglement and integrated with the scrims 12 and 14 through entanglement, both entanglements being of the kind typically produced by a needling operation. If desired, an intermediate layer 18 of staple fibers can be provided between the double scrims 12 and 14 (FIG. 2) to build-up the density and thickness of the resulting belting 10.

Figure 2:
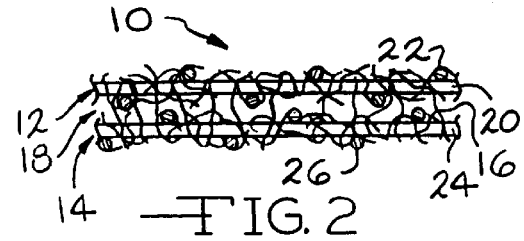
FIG. 2 is a cross-sectional view similar to that shown in FIG. 1 but having an intermediate layer 18 of staple fibers provided between the connected scrims 12 and 14.

While the belting 10 in FIGS. 1 and 2 is shown comprising two scrims 12 and 14 as the strength members connected by staple fibers 16, it is contemplated by the scope of the present invention that the present belting can comprise a plurality of substantially parallel woven or knitted scrims, each pair of adjacent scrims connected by intermediate staple fibers 16. In that respect, the double scrim belting 10 is for illustrative purposes only, and the present invention is not intended to be so limited.

The first woven or knitted scrim 12 includes longitudinally extending or lengthwise warp yarns 20 which are preferably textile yarns and laterally extending or crosswise weft yarns 22, which may be, for example, spun polyester yarns. The second woven or knitted scrim 14 is preferably similar to the first scrim 12, and likewise has lengthwise or longitudinally extending warp yarns 24, which are preferably textile yarns and laterally extending or crosswise weft yarns 26, which may be, for example spun polyester yarns. However, that the scrims, for example, scrim 12 are woven or knitted is not essential as long as the warp yarns 20 are independent of each other, and for the most part, do not cross over each other indiscriminately. Thus, in this embodiment of the present invention, the lengthwise or warp textile yarns 20 and the crosswise or weft yarns 22 are provided in an open weave cloth as the scrim 12. Any weave may be used, a plain weave being stable and therefore advantageous.

The warp textile yarns 20 should have a relatively high tensile breaking strength, for example, on the order of at least about 20 lbs. per inch and preferably greater than 50 lbs. per inch. The nature of the crosswise or weft yarns 22 is not critical and the weft yarns 22 can comprise any conventional synthetic or natural fiber yarns. Advantageously, the denier of the warp and weft yarns and the density of the weave is selected to provide a scrim weight of from between about 4 oz./square yard to about 40 oz./square yard for optimum strength. The connecting staple fibers 16 are, for example, polyester fibers consolidated to scrims 12 and 14 through needling entanglement.

Figure 3:
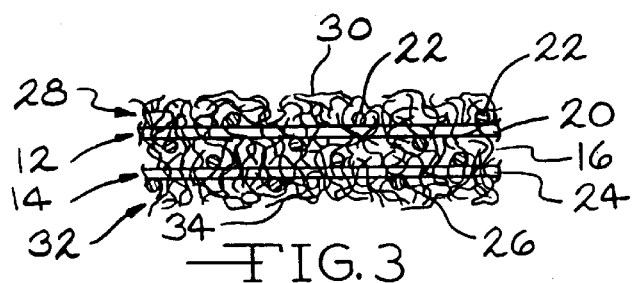
FIG. 3 is a cross-sectional view of another embodiment of the improved conveyor belting according to the present invention having non-woven webs of staple fibers 30, 34 needled to the respective outer surfaces of the scrims 12, 14.

As shown in FIG. 3, if desired, a non-woven web of staple fibers is needled to either or both the outer surface of the first scrim 12 to form a first outer layer 28 of consolidated staple fibers 30 and to the outer surface of the second scrim 14 to form a second outer layer 32 of consolidated staple fibers 34, preferably before the scrims 12, 14 are joined together by the connecting staple fibers 16. The dense, fibrous layers 28 and 32 entangled with scrims 12 and 14 serve as the respective first and second major surfaces of the belting 10.

The webs may be of randomly oriented staple fibers such as synthetic polyamide, polyester, polyolefin, acrylic and like fibers including blends thereof and natural fibers such as jute and blends thereof. Optionally, the fibers may be directionally oriented within the batt by methods known to those skilled in the art.

The webs of staple fibers selected for needling to the textile yarns advantageously have a weight of from between about 2 oz./square yard to 100 oz./square yard. The staple fibers may have a wider denier range than that which is preferred for the warp and weft yarns. The webs may be preneedled using conventional techniques to obtain some integrity of the staple fibers prior to needling the batt to the scrims.

The techniques of needling fibrous webs of staple fibers to scrims woven or knitted from textile yarns are well known and details need not be recited here. The coarseness of the belting needles used, the barb configurations, number, size and other variables are dependent somewhat on the degree of openness between the textile yarns, so as to avoid rupture of the textile yarns. In general, a No. 28 gauge needle is preferred, with the barbs oriented so as not to tear the lengthwise yarns. The needling frame may be fitted with either high or low density needle boards, a 34 density board being illustrative. Needling is preferably carried out to produce a needled fabric scrim 12, 14 having a weight within the range of from between about 6 oz./square yard to about 90 oz./square yard.

If staple fibers are needled only to the outer surfaces of one of the scrims, i.e., only to the outer surfaces of either scrim 12 or 14, fibers from the connecting staple fibers 16 are carried to the outer surface of the opposite scrim to produce a light "nap" or fuzz of loose fiber ends on that side.

Figure 4:
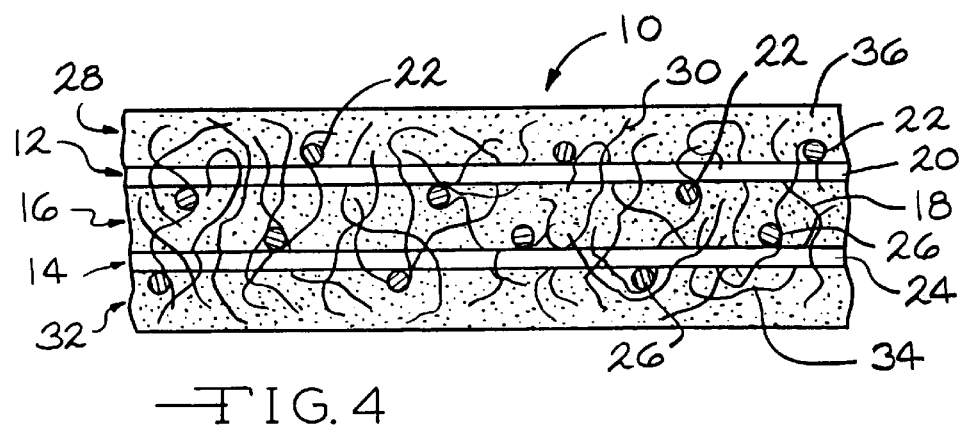
FIG. 4 is an enlarged cross-sectional view of still another embodiment of the improved conveyor belting according to the present invention encapsulated in an elastomeric material 36.

As shown in FIG. 4, in one preferred embodiment of the present belting 10, the connecting staple fibers 16, the scrims 12 and 14 and the first and second major fibrous surfaces 28 and 32 are completely encapsulated in a matrix of an elastomeric material 36. There is a high degree of bonding between the elastomer 36, the scrims 12 and 14, and the staple fibers 16, 30 and 34. For illustrative purposes, only a few staple fibers 16, 30 and 34 are shown in FIGS. 1 to 4.

Following needling, it is advantageous to calendar those needled beltings wherein further consolidation is desired, particularly in those beltings where a web of staple fibers is needled to the outer surface of only one of the scrims. In that respect, the calendaring step serves to further compact and consolidate the staple fibers to reduce fluid permeability of the needled belting. This enhances retention of the liquid elastomeric material 36 received by the needled belting 10 in the saturation step. Generally, it is desirable to have a belting ready for saturation, characterized by its ability to accept and retain the elastomeric liquid precursor until solidification occurs. If the needled belting lacks this characteristic, calendaring may be advantageous. Calendaring is not generally necessary if webs of staple fibers have been needled to both outer surfaces of the double-scrim belting, i.e., the belting shown in FIG. 3.

If desired, the needled and possibly calendared belting 10 is heat set in an oven (not shown) to selectively shrink the fabric comprising the scrims 12 and 14 before the belting 10 is subjected to the saturation step. During heat setting, the fabric may be tensioned in the lengthwise direction (along the axis of the textile yarns) under from between about 0.5 lbs. per inch to about 20 lbs. per inch or more of width. This eliminates a large degree of stretching in the final product, and obviates wrinkles across the width and along the length of the belting 10 of the present invention. Heat setting is carried out under hot air temperatures dependent on the nature of the fibers and yarns employed in the needled fabric scrims. Those skilled in the art will know which temperatures to select. For example, when the warp and weft yarns and staple fibers comprise polyester, heat setting may be carried out at temperatures within the range of from between about 300° F. to 420° F.

A wide range of liquid polymeric saturants may be employed. Representative are the liquid precursors of polyurethane, polyvinyl chloride, neoprene, styrene-butadiene and like non-cellular polymeric resins. Particularly preferred polymeric saturants are the liquid carboxylated acrylonitrile-butadiene copolymer latex resins. The acrylonitrile-butadiene copolymer elastomers formed from them are highly flexible, crack-resistant even at low temperatures and form strong bonds with the textile components of the fabric scrims of the invention. Liquid polymeric saturants without carriers and or solvents may be used, however, a latex polymeric saturant employing a water carrier is advantageous. Liquid saturants employing organic solvents and carriers can also be used as those skilled in the art will appreciate.

Desirably, the saturation of the heat set and needled belting 10 will provide high loading of elastomer, substantially penetrating the textile fabric scrims 12 and 14 so as to encapsulate the intermediate fibrous layer 18. Advantageously, the majority of voids in the textile fabric scrims and in the various fibrous layers are filled with the elastomeric material 36 so that elastomer is distributed throughout the body of the final product. Curing may be affected by any means appropriate for the elastomeric saturant. For example, by heat for heat curable elastomers. Advantageously the saturated belting 10 is passed through a heated platen press at a temperature sufficient to cure the elastomeric material 36, and if desired, the saturated belting 10 is simultaneously pressed. Pressures of from between about 50 lbs./square inch to about 200 lbs./square inch are practical and illustrative of pressures which may be employed. Preferably the saturated belting 10 is pressed and cured under pressures of from between about 90 lbs./square inch to 130 lbs./square inch. Preferably, the saturation of the belting 10 of the present invention will be such that the cured elastomeric material 36 constitutes from between about 50 percent to about 500 percent, preferably 100 percent to 350 percent of the belting weight.

Advantageously, the warp textile yarns 20, 24 will have low stretch properties, for example on the order of at least about 4 percent to 5 percent (½ nominal breaking load) to about 15 percent to 20 percent. Further, it is important that the warp yarns 20, 24 exhibit uniformity in their shrink characteristics, i.e., warp yarns of a high degree of shrinkability should not be mixed with warp yarns of a low degree of shrinkability to minimize buckling or cockling of the finished belting 10. In that respect, the warp yarns 20, 24 may be selected from a wide variety of synthetic yarns, such as polyester, polyamide and like yarns. Preferably the warp yarns 20, 24 will be spun yarns or the like having a tendency to absorb and hold the polymeric elastomeric material 36 (FIG. 4).

Figure 5:
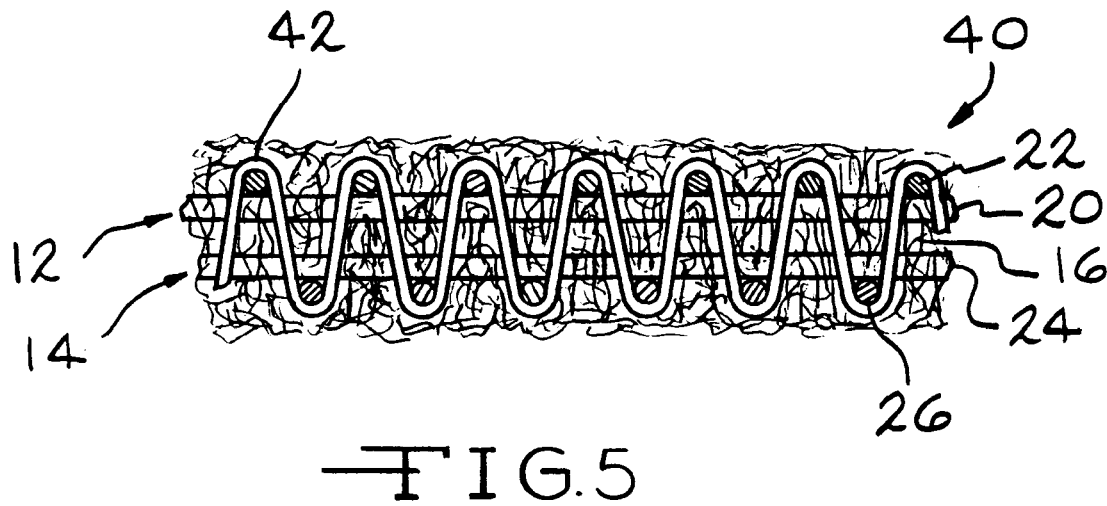
FIG. 5 is a cross-sectional view of another embodiment of the improved conveyor belting 40 according to the present invention having binder members 42 reinforcing the connected scrims 12, 14.

FIG. 5 shows another belting 40 according to the present invention which incorporates all aspects of the previously described belting 10. To further strengthen the connection between the scrims 12, 14, the scrims in belting 40 are additionally joined together by binder members 42 which extend in a direction of the thickness of the overlaid double scrims. The binder members 42 serve as reinforcing members that are incorporated into the belting by, for example, sewing, stitch-bonding, or trifting, with yarn or cord. These techniques for incorporating the binder members 42 into the belting 40 are well known to those skilled in the art.

A noteworthy advantage of the belting 40 of the present invention constructed having the scrims 12,14 joined by the staple fibers 16 is that in addition to connecting between the scrims, the staple fibers provide a light "nap" or fuzz of loose fiber ends on the side of the belting 40 opposite that from which they are needled. If desired, a nap can be provided on both sides of the belting 40 by needling the connecting shape fibers 16 from each major surface thereof, without the need for the additional steps of needling the fibrous layers 28 and 32 to the respective first and second major belting surfaces. This nap is particularly beneficial if positioned on the side of the belting in contact with the pulleys, rollers and other equipment comprising the conveyor system (not shown). Then, the binder members 42 provide increased strength to the belting 40, particularly in the direction of its thickness, while the nap provides for enhanced noise reduction and a soft carrying surface for improved transport without damaging the items being carried. Such advantages are not possible with a double-scrim belting having an intermediate layer of fibrous material disposed between the first and second scrims and tied together with binder cords, such as is shown in the previously referenced patents to Long. If desired, the scrims 12,14 can be pre-needled with the respective fibrous layers 28,32 for additional noise reduction and cushioning.

Figure 6:
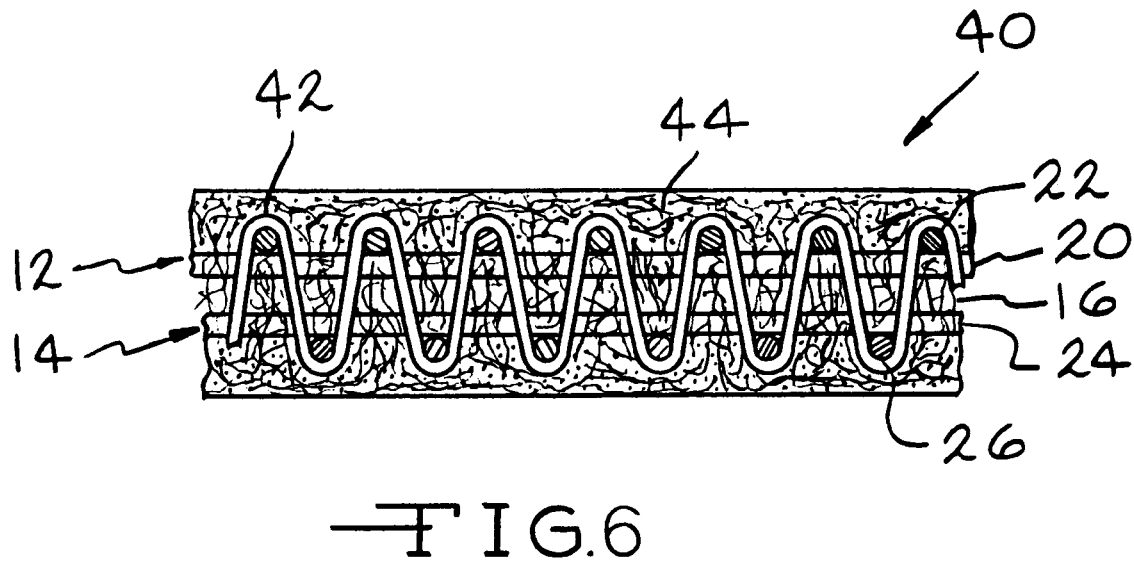
FIG. 6 is a cross-sectional view of the belting 40 shown in FIG. 5 encapsulated in an elastomeric material 44.

As is the case with the belting 10 shown in FIGS. 1 to 4, whether the scrims 12 and 14 are pre-needled before they are connected by the staple fibers 16 and the binder members 42, as previously discussed, a non-woven web of staple fibers can be provided between the scrims 12, 14. This intermediate web can serve as the connecting staple fibers 16 or additional staple fibers can be spread on the uppermost scrim and carried between the scrims by the needling operation. Also, only one of the scrims can be preneedled. If desired, the belting 40 is incorporated in a matrix of an elastomeric material 44 (FIG. 6), similar to that provided for the belting 10.

Preferably, an effective amount of an antimicrobial biocidal or biostatic substance, such as chlorinated phenol is incorporated into the polymeric elastomeric material 36, 44 to resist growth of fungus, yeast, viruses, and Gram-positive and Gram-negative bacteria including Staph, *E coli*, Klebsiella and Salmonella on the beltings 10, 40. The preferred antimicrobial biocidal or biostatic substance is 5-chloro-2-(2,4-dichlorophenoxy) phenol. This antimicrobial biocidal or biostatic substance is non-toxic and free of heavy metals. An alternative antimicrobial agent that meets this criteria is polyhexamethylene biguanide hydrochloride (PHMB). These compounds are sold by the Microban Products Company, Huntersille, N.C. Other chemical compounds having known antimicrobial biocidal or biostatic tendencies may also be used.

The antimicrobial agent is put into powder form and mixed with the thermoplastic material. From 1 to 9 percent by weight of the total powder comprises the antimicrobial substance. Preferably the antimicrobial biocidal or biostatic substance is from 2 to 5.5 percent by weight of the thermoplastic powder into which it is incorporated. The antimicrobial agent will migrate through the polymer to the surface from the amorphous zones of the polymer until equilibrium of the antimicrobial agent's internal vapor pressure is reached. If the antimicrobial substance on the surface of the coating is removed by friction or other means, more antimicrobial agent will move to the surface until the antimicrobial agent's internal vapor pressure is once again at equilibrium. Incorporating the antimicrobial agent into the polymeric elastomeric material 36, 44 inhibits bacterial growth and promotes asepsis on the belting surface. This is especially advantageous when the belting 10, 40 is used to convey food grade products, such as eggs, poultry, vegetables and the like.

An alternative approach is to spray or otherwise apply a surface coating of the antimicrobial agent onto the belting 10, 40 or the yarns are coated with the antimicrobial agent before they are woven or knitted into the scrims 12, 14. Likewise, the binder members 42 can have a surface coating of the antimicrobial agent before incorporation into the belting 40 of the present invention. For a more detailed discussion of the use of the antimicrobial agent in a coating process, reference is made to U.S. Pat. No. 5,238,749 to Cueman et al., and to use of the antimicrobial agent in a surgical drape, reference is made to U.S. Pat. No. 5,069,907 to Mixon et al., the disclosures of which are incorporated herein by reference.

Figure 7:
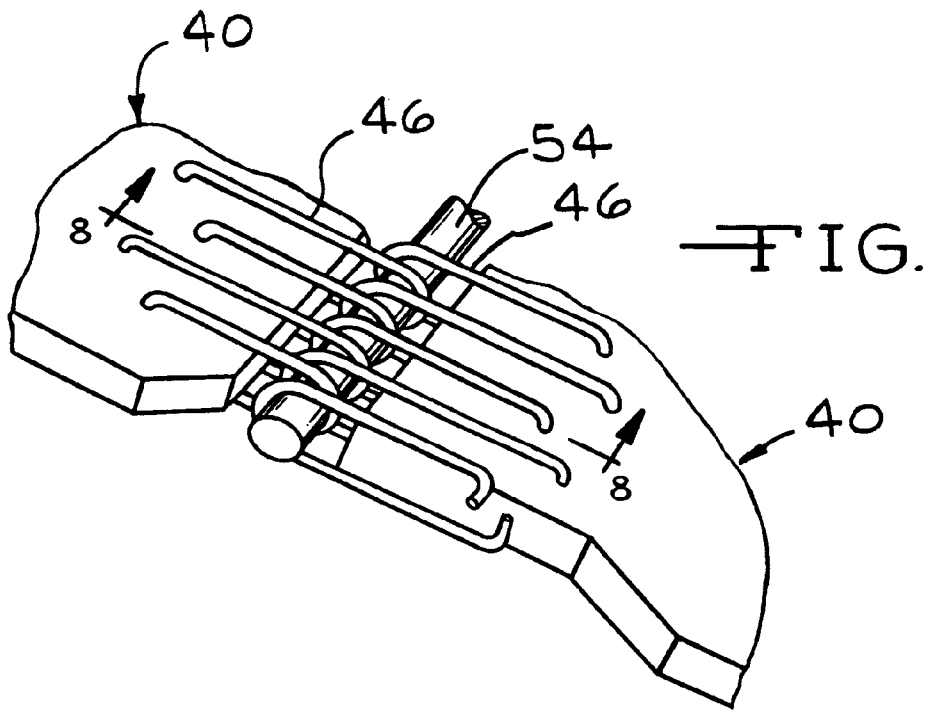
FIG. 7 is a fragmentary perspective view of the double-scrim belting of the present invention without the encapsultary elastomer material and spliced to form an endless belting.
Figure 8:
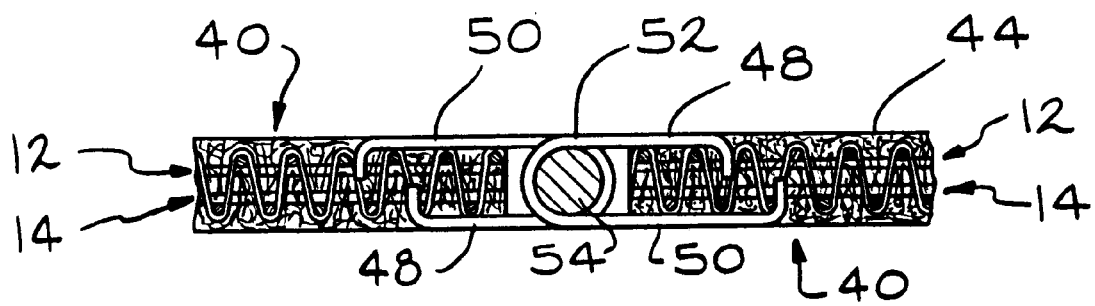
FIG. 8 is a cross-sectional view along line 8—8 of FIG. 7 but with the belting encapsulated in the elastomeric material 44.

FIGS. 7 and 8 show the beltings of the present invention, for example belting 40, spliced into an endless belt for use in transporting objects as part of a conveyor system (not shown). However, FIG. 7 shows the spliced belting 40 without the encapsulating elastomeric material 44 and FIG. 8 shows the spliced belting 40 encapsulated in the elastomeric material 44.

To form the endless belting, a plurality of hook-type fasteners 46, each having a short leg 48 and a long leg 50 are first set into the belting 40. The spike ends of the fasteners 46 are driven into the belting 40 in alternating orientation with a short leg 48 of one fastener 46 disposed between the long legs 50 of two adjacent fasteners 46 and with the loop 52 of the various fasteners 46 spaced laterally equidistant from the belting edge and spaced longitudinally equidistant along the length of the edge of the belting 40. However, the fasteners 46 provided at each belting 40 end are staggered so that the fasteners 46 set into one end of the belting 40 are disposed intermediate and evenly spaced between the fasteners 46 set into the other end of the belting 40. The splicing process is completed with a pivot rod 54 that is captured between the loops 52 of the various fasteners 46 to serve to connect the belting ends in an endless manner and provide for hinging movement as the belting 40 travels over a conveyor mechanism (not shown).

As particularly shown in FIG. 8, the double-scrim construction of the belting 40 of the present invention provides a structure that has increased strength and durability at the splicing zone. The opposite spike ends of each fastener 46 are set into scrims 12 and 14, which independently serve as the strength members of the belting. That way, the pulling, tugging and tensile forces that are brought to bear on the legs of each fastener 46 are evenly distributed to the spaced apart scrims 12 and 14. Each scrim 12, 14 absorbs a fraction of the tensile load that would normally be experienced in a single scrim construction. Thus, the belting 40 of the present invention is better able to hold up to continuous duty as compared to prior art belting. The intermediate connecting staple fibers 16 and the binder members 42 further help to dissipate the tensile forces to further prolong the useful life of the belting 40. The belting 40 of the present invention not only benefits maintenance costs, but can have significant advantages in reduced operation down time.

In particular embodiments of the present invention, the yarns and elastomeric components of the beltings 10, 40 may be selected to provide electrical conducting properties. By appropriate selection of electrically conductive materials, the conveyor beltings 10, 40 of the present invention can facilitate the discharge of static electrical energy in a well-grounded conveyor system. For example, the elastomeric material 36, 44 may be compounded to include as filler, carbon black and graphite particle fillers to render the belting electrically conductive. Such beltings have been known to obtain surface electrical resistances of from $1 \times 10^7$ ohms to $1 \times 10^4$ ohms at 400 volts. This property is particularly advantageous for conveying electrical components.

Depending on the density of the weave of the scrim cloths and the various fibrous layers, the belting 10, 40 can be provided with some voids that are not filled with the elastomeric material 36, 44. The unfilled voids provide the beltings 10, 40 with insulative properties and also provide for a quiet running belting 10, 40 in use.

If desired, at least one and preferably both of the upper and lower belt surfaces are abraded away to impart a unique and uniform surface and to make a belting 10, 40 of uniform thickness. Additionally, the abrasion process provides the belting having a reduced coefficient-of-friction in contact with the belt drive mechanism. Abrasion may be carried out using conventional abrading apparatus and techniques. For example, the beltings 10, 40 of the present invention may be passed under a rotating abrasive cylinder and in surface contact therewith. Advantageously the abrasion process utilizes a grit range of from 50 to 600, perferably 100 to 250. This provides a final belting product of uniform thickness, having a felt-like surface appearance.

The advantage of an abraded, double-scrim elastomeric material belting is that the abrasion process acts to "free" the tips of the staple fibers from the encapsulating saturant to provide a felt-like nap while the elastomeric material 36, 44 surrounds the major portion of the staple fibers to provide a belting that can withstand continuous duty without deteriorating and losing its nap. This abraded characteristic gives the beltings 10, 40 of the present invention superior wicking characteristics to absorb oil and the like. The oil is drawn up and moved into the interior of the belting by capillary action of the oil along the staple fibers. The intermediate staple fibers 16 serve as a "reservoir" so that the beltings 10, 40 of the present invention have an increased absorption capacity over prior art belting. Additionally, the surface is soft, resilient, sound-absorbent and offers resistance to damaging articles conveyed on it.

Figure 9:
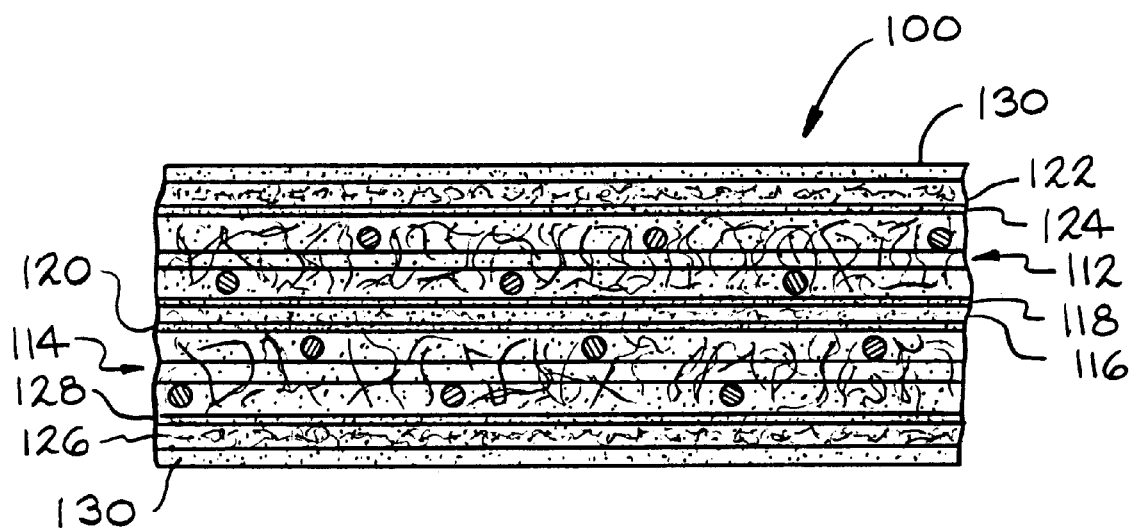
FIG. 9 shows another embodiment of the multiple-scrim belting 100 of the present invention comprising a laminated belting.

FIG. 9 shows another embodiment of the double-scrim belting 100 of the present invention. Belting 100 is a laminate comprising a first woven scrim 112, a spaced apart and substantially parallel second woven scrim 114 and an intermediate layer of consolidated staple fibers 116. The staple fibers are preferably consolidated together through entanglement of the type formed by a needling operation. The layer of staple fibers is integrated or adhered to the scrims 112 and 114 by respective layers of bonding material, indicated as layer 118 bonding between scrim 112 and the fibrous layer 116 and layer 120 bonding between scrim 114 and the fibrous layer 116. The scrims 112 and 114 are similar in construction to previously described scrims 12 and 14 and fibrous layer 116 is similar to the layer of staple fibers 18 provided to connect the scrims 12 and 14. The layers 118 and 120 of bonding material comprise either an elastomeric material similar to the previously described encapsulating elastomeric material 36 or an adhesive material, as is well known to those skilled in the art. The bonding layers 118 and 120 are preferably between about 10 to 15 mils thick. The thusly formed laminated belting is preferably calendared followed by a heat setting step to insure an integral construction.

If desired, an outer fibrous layer is bonded or adhered to either or both the outer surfaces of scrims 112 and 114. This construction forms a first outer layer 122 of staple fibers laminated to the outer surface of the first scrim 112 by bonding layer 124 and a second outer layer 126 of staple fibers laminated to the outer surface of the second scrim 114 by bonding layer 128. Additional outer layers (not shown) of staple fibers can be bonded to either or both of the outer layers 122 and 126.

If desired, the double-scrim belting 100 is encapsulated in a matrix of elastomeric material 130. It is also contemplated by the scope of the present invention that the elastomeric material 130 can be provided with conductive adhesives or with antimicrobial additives, as previously described with respect to belting 10. Also, the upper and lower belt surfaces can be abraded to provided the belting 100 having the abraded characteristics described with respect to the belting 10 including reduced coefficient-of-friction surfaces.

In the belting 100 shown in FIG. 9, there is a high degree of bonding between the elastomeric material 126, the scrims 112 and 114, the layers of staple fibers 116, 122 and 126, and the bonding layers 118, 120, 124 and 128. As was the case with the belting 10, this provided unexpected and unobvious benefits when an endless belting is constructed from the double-scrim belting. In an endless belting, the generated tensile forces at the fastened zone are distributed between two scrims 112, 114 which in turn are integrally bonded to the intermediate fibrous layer 116. This construction exhibits superior wear characteristics in comparison to other types of prior art belting under continuous duty conditions.

It is intended that the foregoing description be only illustrative of the present invention and that the present invention be only limited by the hereinafter appended claims.

What is claimed is:

1. A conveyor belting, which comprises:
   (a) at least two generally planar and parallel scrim means, each comprising a plurality of substantially parallel textile yarns;
   (b) fibrous material provided intermediate the at least two scrim means, the fibrous material being in the form of discrete staple fibers consolidated together through entanglement of the individual fibers and the discrete staple fibers being integrated with the yarns comprising the scrim means by entanglement of the fibrous material therewith to connect between and thereby join the at least two scrim means, both entanglements being of the character produced by a needling operation;
   (c) a multiplicity of binding means extending substantially in a direction of a thickness of the at least two scrim means joined together by the entangled staple fibers to reinforce the connection between the scrim means; and
   (d) a polymeric material encapsulating the adjacent scrim means, the connecting fibrous material and the binding means.

2. The conveyor belting of claim 1 wherein the connecting fibrous material is provided as a layer of staple fibers connecting the two adjacent scrim means.

3. The conveyor belting of claim 1 wherein there is further provided an outer layer of fibrous material formed of discrete staple fibers consolidated with the exposed outer surface of at least one of the outermost scrim means through entanglement of the individual staple fibers comprising the outer layer and through needling entanglement with the yarns comprising the scrim means, and wherein the adjacent scrim means, the connecting staple fibers, the binding means, and the outer layer of fibrous material are encapsulated in the synthetic polymeric material.

4. The belting of claim 3 wherein the outer layer of fibrous material is formed by needling a non-woven web of staple fibers to each of the exposed outer surfaces of the outermost scrim means.

5. The belting of claim 3 wherein the encapsulated outer layer of fibrous material is provided with an abraded finish that serves to wear away a surface portion of the polymeric material to a generally uniform depth to expose end portions of the fibrous material comprising the outer layer.

6. The belting of claim 1 wherein the textile yarns are incorporated in a cloth as the scrim means.

7. The belting of claim 6 wherein the textile yarns comprise lengthwise yarns provided in a knitted cloth as the scrim means.

8. The belting of claim 6 wherein the textile yarns comprise lengthwise yarns provided in a woven cloth as the scrim means.

9. The belting of claim 1 wherein the textile yarns are polyester.

10. The belting of claim 1 wherein the staple fibers are polyester.

11. The belting of claim 1 wherein the polymeric material comprises a latex.

12. The belting of claim 11 wherein the latex is an acrylonitrile-butadiene copolymer.

13. The belting of claim 1 wherein at least one of the textile yarns, the staple fibers, the binding means and the polymeric material contain an effective amount of an antimicrobial compound to inhibit bacterial growth on the belting.

14. The belting of claim 1 wherein the polymeric material is provided with an electronically conductive additive.

15. The belting of claim 14 wherein the electronically conductive additive is selected from the group consisting of carbon black, graphite and combinations thereof.

16. The conveyor belting of claim 1 wherein opposed ends at the longitudinal extent of the belting are connected by fastener means to form an endless belting.

17. The conveyor belting of claim 16 wherein the fastener means comprise hook-type fasteners having spaced apart legs extending from a loop portion of the fastener and wherein at least two fasteners are attached to each end of the belting with the spaced apart legs of each fastener secured to one of the two scrim means comprising the belting, and wherein the fasteners provided at each end are joined by a pivot rod means captured between the loop portion of the fasteners provided at each end of the belting.

18. A conveyor belting, which comprises:
   a) at least two generally planar and parallel scrim means, each comprising a plurality of substantially parallel textile yarns;
   b) fibrous material provided to connect between the two scrim means to thereby join the same, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation;
   c) a multiplicity of binder means extending substantially in a direction of a thickness of the at least two scrim means connected together by the entangled staple fibers to reinforce the connection between the scrim means;

d) a polymeric material encapsulating the adjacent scrim means, the connecting fibrous material and the binder means; and e) an outer layer of fibrous material formed of discrete staple fibers consolidated with the exposed outer surface of at least one of the outermost scrim means through entanglement of the individual fibers comprising the outer layer and through needling entanglement with the yarns comprising the scrim means, and wherein the adjacent scrim means, the connecting staple fibers, the binder means and the outer layer of fibrous material are encapsulated in the synthetic polymeric material.

19. The belting of claim 18 wherein the outer layer of fibrous material is characterized by a non-woven web of staple fibers needled to each of the exposed outer surfaces of the outermost scrim means.

20. A conveyor belting, which comprises:

a) at least two generally planar and parallel scrim means, each comprising a plurality of substantially parallel textile yarns;

b) fibrous material provided to connect between the two scrim means to thereby join the same, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation;

c) a multiplicity of binder means extending substantially in a direction of a thickness of the at least two scrim means connected together by the entangled staple fibers to reinforce the connection between the scrim means;

d) and a polymeric material encapsulating the adjacent scrim means, the connecting staple fibers and the binder means, and wherein at least one of the textile yarns, the staple fibers, the binder means, and the polymeric material contain an effective antimicrobial amount of a compound to inhibit bacterial growth on the belting.

21. A conveyor belting, which comprises:

a) at least two generally planar and parallel scrim means, each comprising a plurality of substantially parallel textile yarns;

b) fibrous material provided to connect between the two scrim means to thereby join the same, the connecting fibrous material being in the form of discrete staple fibers consolidated through entanglement of the individual fibers and being integrated with the yarns comprising the scrim means by entanglement of the fibrous material therewith, the entanglements being of the character produced by a needling operation;

c) a multiplicity of binder means extending substantially in a direction of a thickness of the at least two scrim means connected together by the entangled staple fibers to reinforce the connection between the scrim means;

d) a polymeric material encapsulating the adjacent scrim means, the connecting staple fibers and the binder means; and e) fastener means at the opposed ends of the longitudinal extent of the belting to form an endless belting wherein the fastener means comprise hook-type fasteners having spaced apart legs extending from a loop portion of the fastener and wherein at least two fasteners are attached to each end of the belting with the spaced apart legs of each fastener secured to one of the two scrim means comprising the belting, and wherein the fasteners provided at each end are joined by a pivot rod means captured between the loop portion of the fasteners provided at each end of the belting.

22. A method for manufacturing a conveyor belting, which comprises:

(a) providing at least two generally planar and parallel scrim means, each comprising a plurality of substantially parallel textile yarns;

(b) joining the scrim means in a needling step wherein an intermediate fibrous material in the form of discrete staple fibers is consolidated together through entanglement of the individual fibers by the needling and the discrete staple fibers are integrated with the yarns comprising the at least two scrim means to thereby connect between the scrim means by entanglement of the fibrous material therewith during the needling;

(c) reinforcing the joined scrim means by providing a multiplicity of binder means extending substantially in a direction of a thickness of the at least two scrim means joined together by the entangled staple fibers; and (d) encapsulating the scrim means, the connecting fibrous material and the binder means by drawing them through a bath of polymeric material.

23. The method of claim 22 including providing the connecting fibrous material as a layer of fibrous material connecting the two adjacent scrim means.

24. The method of claim 22 including the step of needling an outer layer of fibrous material formed of discrete staple fibers to the exposed outer surface of at least one of the outermost scrim means through entanglement of the individual staple fibers comprising the outer layer and through needling entanglement with the yarns comprising the scrim means.

25. The method of claim 24 including needling the outer layer of fibrous material to each of the exposed outer surfaces of the outermost scrim means.

26. The method of claim 24 including the step of abrading an exposed surface portion of the polymeric material to a generally uniform depth and to an extent sufficient to expose end portions of the fibrous material comprising the outer layer.

27. The method of claim 22 wherein the textile yarns are incorporated in a cloth as the scrim means.

28. The method of claim 27 wherein the textile yarns comprise lengthwise yarns provided in a knitted cloth as the scrim means.

29. The method of claim 27 wherein the textile yarns comprise lengthwise yarns provided in a woven cloth as the scrim means.

30. The method of claim 22 wherein the textile yarns are polyester.

31. The method of claim 22 wherein the staple fibers are polyester.

32. The method of claim 22 wherein the polymeric material comprises a latex.

33. The method of claim 32 wherein the latex is an acrylonitrile-butadiene copolymer.

34. The method of claim 22 further including the step of inhibiting bacterial growth on the belting by incorporating an effective amount of an antimicrobial compound into at least one of the textile yarns, the staple fibers, the binder means and the polymeric material.

35. The method of claim 22 wherein the textile yarns extend longitudinally along the length of the scrim means and further including the step of tensioning the scrim means, the connecting fibrous material and the binder means in the longitudinal direction under a force of from between about 0.5 lbs. to about 20 lbs. per inch of fabric width.

36. The method of claim 35 further including the step of heat setting the scrim means, the connecting fibrous material and the binder means while under the tensioning force.

37. The method of claim 22 further including the step of curing the polymeric material.

38. The method of claim 37 wherein the curing step is carried out by moving the saturated belting through a hot air oven.

39. The method of claim 22 including the step of incorporating into the polymeric material an electronically conductive additive.

40. The method of claim 39 including selecting the electronically conductive additive from the group consisting of carbon black, graphite and combinations thereof.

41. The method of claim 22 further including the step of connecting opposed ends along the longitudinal axis of the belting using fastener means to form an endless belting.

42. The method of claim 41 wherein the fastener means comprise hook-type fasteners having spaced apart legs extending from a loop portion of the fastener and including the step of connecting the opposed ends of the belting by attaching at least two fasteners to each end of the belting by securing the spaced apart legs of each fastener to one of the two scrims means comprising the belting and then joining the fasteners provided at each end by a pivot rod means captured between the loop portion of the fasteners provided at each end.

43. A method for manufacturing a conveyor belting, which comprises:
   a) providing at least two generally planar and parallel scrim means, each comprising a plurality of substantially parallel textile yarns;
   b) joining the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;
   c) reinforcing the joined scrim means by providing a multiplicity of binder means extending substantially in a direction of a thickness of the at least two scrim means connected together by the entangled staple fibers;
   d) encapsulating the scrim means, the connecting fibrous material and the binder means by drawing them through a bath of polymeric material; and
   e) needling an outer layer of fibrous material formed of discrete staple fibers to the exposed outer surface of at least one of the outermost scrim means through entanglement of the individual fibers comprising the outer layer and through needling entanglement of the fibrous material with the yarns comprising the scrim means.

44. The method of claim 43 including needling the outer layer of fibrous material to each of the exposed outer surfaces of the outermost scrim means.

45. A method for manufacturing a conveyor belting, which comprises:
   a) providing at least two generally planar and parallel scrim means, each comprising a plurality of substantially parallel textile yarns;
   b) joining the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;
   c) reinforcing the joined scrim means by providing a multiplicity of binder means extending substantially in a direction of a thickness of the at least two scrim means connected together by the entangled staple fibers;
   d) encapsulating the scrim means, the connecting fibrous material and the binder means by drawing them through a bath of polymeric material; and
   e) inhibiting bacterial growth on the belting by incorporating an effective antimicrobial amount of an antimicrobial compound into at least one of the textile yarns, the staple fibers, the binder means and the polymeric material.

46. A method for manufacturing a conveyor belting, which comprises:
   a) providing at least two generally planar and parallel scrim means, each comprising a plurality of substantially parallel textile yarns;
   b) joining the scrim means in a needling step wherein fibrous material in the form of discrete staple fibers is consolidated through entanglement of the individual fibers by the needling and the staple fibers are integrated with the yarns comprising the scrim means by entanglement of the fibrous material therewith during the needling;
   c) reinforcing the joined scrim means by providing a multiplicity of binder means extending substantially in a direction of a thickness of the at least two scrim means connected together by the entangled staple fibers;
   d) encapsulating the scrim means, the connecting fibrous material and the binder means by drawing them through a bath of polymeric material; and
   e) connecting opposed ends along the longitudinal axis of the belting using fastener means to form an endless belting, wherein the fastener means comprise hook-type fasteners having spaced apart legs extending from a loop portion of the fastener and wherein connecting the opposed ends of the belting includes attaching at least two fasteners to each end of the belting by securing the spaced apart legs of each fastener to one of the two scrim means comprising the belting and then joining the fasteners provided at each end by a pivot rod means captured between the loop portion of the fasteners provided at each end.

47. A conveyor belting having antimicrobial characteristics that inhibit bacterial growth and promote asepsis on the belting, which comprises:
   a) a plurality of substantially parallel textile yarns comprised of a polymeric material; and
   b) an antimicrobial agent associated with the textile yarns wherein the antimicrobial agent is provided as a topical applicant applied to an exposed surface of the textile yarns or is incorporated into the polymeric material thereof, wherein when the antimicrobial agent is incorporated into the polymeric material, the antimicrobial agent exhibits controlled migration through the polymeric material comprising the yarns to the exposed surface thereof when an imbalance of vapor pressure of the antimicrobial agent demands surface equalization to thereby continuously inhibit bacterial growth and promote asepsis on the belting.

48. The belting of claim 47 wherein the textile yarns are incorporated as yarns in a cloth.

49. The belting of claim 47 wherein the antimicrobial agent is present in the polymeric material in an amount of about 0.0 5 percent to about 2.0 percent, by weight, of the material.

50. A conveyor belting having antimicrobial characteristics that inhibit bacterial growth and promote asepsis on the belting, which comprises:

a) a plurality of substantially parallel textile yarns;

b) an encapsulating material substantially enveloping the textile yarns, wherein either or both the textile yarns and the encapsulating material are comprised of a polymeric material; and c) an antimicrobial agent associated with the textile yarns and the encapsulating material wherein the antimicrobial agent is provided as a topical applicant thereto or is incorporated into the polymeric material comprising either or both of the textile yarns and the encapsulating material to inhibit bacterial growth and promote asepsis on the belting, wherein when the antimicrobial agent is incorporated into the polymeric material, the antimicrobial agent exhibits controlled migration through the polymeric material to the exposed surface thereof when an imbalance of vapor pressure of the antimicrobial agent demands surface equalization to thereby continuously inhibit bacterial growth and promote asepsis on the belting.

51. The conveyor belting of claim 50 wherein the textile yarns comprise warp yarns extending in a lengthwise direction of the belting and wherein a plurality of weft yarns extend perpendicular to the warp yarns to thereby form a woven or knitted cloth comprising the belting.

52. The conveyor belting of claim 51 wherein the weft yarns are comprised of the polymeric material having the antimicrobial agent either applied as the topical applicant thereto or incorporated therein.

\* \* \* \* \*

UNITED STATES PATENT AND TRADEMARK OFFICE
CERTIFICATE OF CORRECTION

PATENT NO : 5,906,269
DATED : May 25, 1999
INVENTOR(S): Florian S. Zabron et al.

It is certified that error appears in the above-identified patent and that said Letters Patent is hereby corrected as shown below:

At column 8, line 29, change "perferably" to --preferably--.

Signed and Sealed this

Thirtieth Day of November, 1999

Attest:

Q. TODD DICKINSON

*Attesting Officer*    *Acting Commissioner of Patents and Trademarks*